June 10, 1969     E. W. JACKOBOICE     3,448,633
FLEXIBLE CONTROL MECHANISM FOR VALVES AND THE LIKE
Filed Dec. 30, 1966
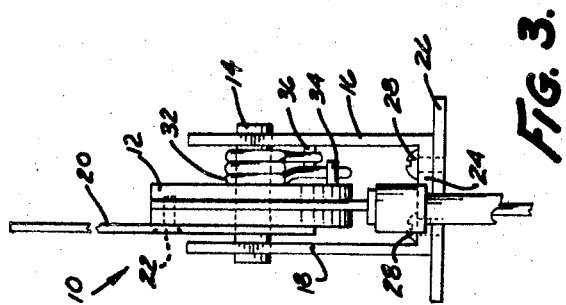
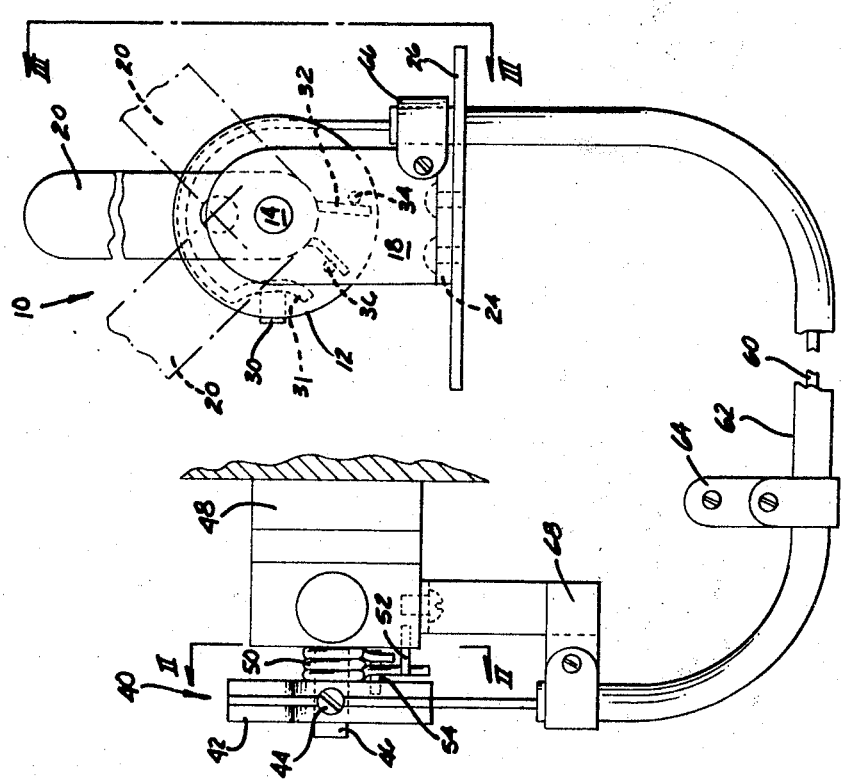
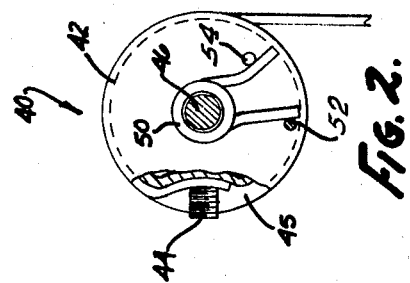
INVENTOR.
EDWARD W. JACKOBOICE
BY *Price & Heneveld*
ATTORNEYS

United States Patent Office 3,448,633
Patented June 10, 1969

3,448,633
FLEXIBLE CONTROL MECHANISM FOR
VALVES AND THE LIKE
Edward W. Jackoboice, Grand Rapids, Mich., assignor to Monarch Road Machinery Company, Grand Rapids, Mich., a corporation of Michigan
Filed Dec. 30, 1966, Ser. No. 606,195
Int. Cl. F16c 1/18
U.S. Cl. 74—501.5                              1 Claim

ABSTRACT OF THE DISCLOSURE

A control mechanism for manually actuating remotely positioned devices such as hydraulic valves, wherein a pair of sheave-like pulley wheels are interconnected by a flexible tension member entrained about each, with a torsion spring acting on each such wheel to produce a balance point of spring equilibrium and to return the mechanism back to such equilibrium point whenever it has been deliberately moved in either direction away from the same, and wherein an operating handle is secured to one such wheel and the other wheel is attached to the remote device to operate the latter in either of two possible directions as a result of movement of the operating handle.

---

This invention relates to control mechanisms by which a remotely positioned device may be actuated, and more particularly it relates to a mechanical control system utilizing a single thin, flexible member for transmitting actuating force to such a remote device.

In the use of such devices as hydraulic valves and the like, particularly those mounted on utility-type automobiles for controlling the operation of snowplow blades and other such external hydraulically-actuated components, the valve has characteristically and conventionally been actuated in the past in two ways. The first uses a rigid control rod which extends from the area of the dashboard of the vehicle into the engine compartment and is there connected to the valve. Alternatively, a Bowden wire or cable arrangement has been used, in which a slideable wire or cable acts as both a tension and compression member as an operating handle is pushed or pulled, to actuate the remote valve by a bell crank or the like attached to the rotatable controlling member of the valve. Such arrangements have always been trouble-prone, in that they do not lend themselves conveniently to the actual facts of the installation, i.e., they cannot conveniently be snaked or angled around all of the bends and corners normally encountered between the dashboard and the valve itself. Consequently, such controls have in practice produced sticking, binding, and generally troublesome operation, which has become notorious to those familiar with such articles.

The present invention has as its major objective the provision of a control mechanism which utilizes a single very flexible member between the valve and the cab or dashboard of the vehicle, which member is subjected only to tension forces and therefore is not subject to the characteristic binding and sticking of previous such controls intended to carry out the same general purpose. The control of the present invention is very easily operated and is not only bi-directional in operation, but is also self-centering at a desired neutral position intermediate operational extremes.

The foregoing major objects of the invention and the advantages provided thereby, together with other objects and advantages equally a part thereof, will become increasingly apparent following consideration of the ensuing specification and its appended claim, particularly when taken in conjunction with the accompanying illustrative drawings setting forth a preferred embodiment of the invention.

In the drawings:

FIG. 1 is a layout drawing showing the overall form of the control, with the valve end thereof shown in side elevation and the control end thereof shown in end elevation;

FIG. 2 is a fragmentary sectional end elevation taken through the vertical plane II—II of FIG. 1; and FIG. 3 is a fragmentary side elevation taken through the plane III—III of FIG. 1.

Briefly stated, the control mechanism of the present invention comprises a driving means and a driven means which are interconnected by a single thin, flexible, tension member which transmits force therebetween by a pulling action exerted on movably mounted components forming a part of both the driving means and the driven means. Resilient biasing components are connected to both such movably mounted components for urging the same in opposite directions and thereby maintaining tension in the aforesaid tension member, such that when the driving means is moved in a first direction it overcomes its own resilient biasing, pulls on the tension member, and moves the driven means to actuate a valve or other remote device connected to the latter, and when the driving means is moved in the opposite direction its allows the resilient biasing of the driven member to move it in the opposite direction, thereby maintaining tension in the tension member and actuating the remote device in a direction opposite to that in which it was first actuated.

Referring now in more detail to the drawings, the driving means of the invention is seen at 10 in FIGS. 1 and 3, the driven means is seen at 40 in FIGS. 1 and 2, and the tension member, comprising a thin flexible cable or wire 60 and an enclosing housing or sheath 62, is shown interconnecting the driven means and the driving means.

The driving means 10 has a movably mounted component 12 in the form of a pulley wheel or drum-like member which is mounted for rotation about its axis on a central shaft 14 journalled in upright parallel side plates 16 and 18. An operating structure 20 in the form of a manual handle is provided for moving the member 12 in a rotating fashion upon its mounting shaft 14. The handle 20 is pivoted on shaft 14 and attached to the member 12 by a screw 22 or the like. Side plates 16 and 18 preferably comprise the leg portions of a channel-shaped member having an interconnecting web 24, by which the driving means may be mounted upon a supporting plate or surface 26, as by screws 28.

The pulley or drum-like member 12 of the driving means 10 is annularly grooved around its circumference, and the housing or sheath 62 for the flexible tension member 60 is arranged to extend upwardly through the support plate 26 in a position adjacent the end edge of the web 24, so that the flexible member 60 extends out of its housing tangentially with respect to the pulley member 12 and may be directly entrained about it, within the aforementioned annular groove. The end of the flexible member 60 is secured to the pulley 12 by a set screw 30 which threads into an appropriately tapped hole extending radially into the pulley from a slight recess 31 formed in the periphery thereof, in which the end of the tension member lies, as shown. Consequently, it will be apparent that rotation of the pulley or drum-like member 12 in a first direction about its axial shaft 14 will pull on the tension member 60 and extend it further out of its housing 62, whereas a movement of the member 12 in the opposite such direction will release the tension on the tension member and allow it to be retracted into its housing.

An important part of the present control mechanism resides in the presence of a resilient biasing member 32, preferably a torsion spring, which mounts on the shaft 14 between one side of the drum-like member 12 and the side plate 16 (FIG. 3). The ends of the spring 32 extend outwardly from the helically coiled central portion thereof, and one of these is indexed behind a pin 34 extending laterally from the side of the pulley member 12, while the other such end of the spring is indexed behind a similar pin 36, which extends inwardly toward the pulley 12 from the inside surface of the side plate 16. This arrangement resiliently biases the pulley or drum-like member 12 such that it tends to rotate about its mounting shaft 14 in a first direction, for example, counterclockwise as seen in FIG. 1.

The driven means 40 of the invention may be said to be similar in form to the driving means 10, in that it also includes a movably mounted component 42 in the form of a pulley or drum-like member which has an annular circumferential track or groove therein for receiving the end of the thin flexible tension member 60 which is opposite the end thereof attached to the driving means 10. Securing of the tension member 60 to the pulley or drum-like member 42 is similarly accomplished by a set screw 44. Member 42 is depicted in FIG. 2 in a manner which shows how the set screw 44 secures the end of the tension member 60 within the recess 45 formed in the pulley or member 42 for this purpose. The pulley or drum-like member 42 is securely mounted on a support shaft 46 passing through its axis of rotation. In this manner the driven means is connectable to a remotely positioned device 48, such as a hydraulic valve, for actuation thereof, as by turning the control shaft of the valve. In the optimum configuration, the control shaft for the valve may conveniently be the same shaft 46 upon which the pulley or drum-like member 42 of the driven means is mounted. However, separate shafts may also be used, by joining them together with a conventional coupling.

The driven means 40 of the device also has a resilient biasing member in the form of a torsion spring 50, and this spring also has outwardly-extending ends which index against a pair of pins such that the spring continually urges the pulley 42 to rotate about its mounting shaft 46. Specifically, one end of the spring rests against a fixed pin 52 extending outwardly from the valve 48 toward the pulley 42, while the other end of the spring rests against a pin 54 which is attached to the pulley 42 and extends away from it and toward the valve 48, as shown. It will thus be seen that spring 50 urges the pulley 42 to turn in a clockwise direction as viewed from the left in FIG. 1, or counterclockwise as seen in FIG. 2, thereby tending to pull the flexible member 60 towards the driven means 40 to reel it around the pulley member 42. As may be recalled, this biasing effect opposes the bias provided by the spring 32 of the driving means 10 noted previously. It is to be noted that the torsion springs 32 and 50 should be substantially identical in terms of the spring force which each exerts, such that the driving means 10 and driven means 40 will remain in a position of equilibrium unless the driving means is intentionally operated by moving the handle structure 20 to rotate its pulley member 12.

The tension member seen at 60 in FIG. 1 is, as has been stated, a thin and very flexible member which is connected between the driving means and driven means only to exert pulling forces on either and not pushing forces, i.e., the member 60 acts only as a tension member and not in compression. The housing 62 is a long, cylindrical sleeve or sheath which covers a major portion of the tension member 30 and protects it from disturbing extraneous objects or materials. This housing should have sufficient structural rigidity of its own to act as a guide for the tension member therewithin and structurally reinforce it, to the extent that pulleys and the like are not needed between the driving means and the driven means to properly locate and guide the thin flexible tension member. A number of brackets 64 may be provided for mounting the housing 62 into a desired configuration, and similar brackets 66 and 68 should be provided at the end extremities of the housing to properly align its inner tension member with the tangential edge of the pulley 12 of the driving means and with the pulley 42 of the drive means, respectively. As seen in FIG. 1, bracket 66 may be attached to the side plate 18, whereas bracket 68 may be attached directly to the remote device 48.

The installation and assembly of the present control mechanism is likely to already be clearly understood. Stated generally, the operation of the mechanism is to transfer a rotary actuating movement from a manual control to a rotatable control shaft of a remote device such as a hydraulic valve for automotoive accessory implement operation.

Stated specifically, the operation of the present control mechanism is as follows. If the remote device is to be actuated in a first exemplary one of its two possible ways (i.e., its control shaft turned in a first rotary direction), the handle 20 of the driving means 10 is moved toward the left as seen in FIG. 1. This turns the pulley 12 in the same direction in which it is urged by the spring 32 and pulls on the tension member 60 by winding or reeling a small part thereof onto the pulley or drum-like member 12. When the tension member is pulled in this direction, it rotates the pulley 42 of the driven means 40 by pulling on it tangentially and unreeling a small amount of the tension member from the periphery of pulley 42, with the pulley thus being rotatively moved in the same direction as the pulley 12, i.e., clockwise as seen in FIG. 2. This rotates the mounting shaft 46 of the pulley and simultaneously rotates the control shaft of the remote valve or other such device.

This movement of pulley 42 of the driven means also places an additional amount of stress on the torsion spring 50. Consequently, under these conditions the stress on the spring 50 in the driven means 40 exceeds that which is on the spring 32 in the driving means. Thus, if the handle 20 is now released, the spring 50 in the driven means will move the pulley 42 thereof back to its original point, at which the handle 20 is centered as shown in FIG. 1, the springs 50 and 32 are once again in equilibrium, and the control shaft of the remote device is returned to its initial operative position.

If it is desired to actuate the remote device in the opposite manner, the handle 20 is moved toward the right as seen in FIG. 1. This reverses the foregoing operation, in that the spring 32 in the driving means 10 now is given an additional torsional stress while the tension member 60 is payed off the pulley 12 and the tension thereupon relaxed at least slightly, to the extent that the torsion spring 50 in the driven means 40 immediately rotates pulley 42 thereof in the opposite direction than was previously true, until limited by the amount of the tension member which has been released or payed off the pulley 12 of the driving means. This, of course, rotates the control shaft of the valve 48 or other such device in the opposite direction, thereby achieving opposite actuation of the valve.

If the handle 20 is now released, the spring 32 of the driving means will overbalance the spring 50 of the driven means and immediately rotate the pulley 12 of the driving means back to its original position, in which the handle 20 is once again centered or in a neutral position. This rewinds the tension member back onto pulley 12 and rotates the pulley 42 of the driven means back to its neutral position, thereby restoring the valve 48 to its previous neutral or initial position of operation.

In accordance with the foregoing disclosure, those skilled in the pertinent arts will immediately see that a new type of control has been provided which is especially advantageous for actuating and controlling remotely positioned devices such as the hydraulic actuating valves used in the automotive field to control external power driven accessories. The system is not subject to the binding and sticking which plagued previous such systems, is very easy to operate, and automatically retores itself to neutral whenever the operating handle is released. Further, the member used to transmit force from the driving means to the driven means is always under tension, and never is placed under compressive loading. Consequently, this member completely avoids and is free of the characteristic limitations, operational failures, and difficulties of systems using a compression member.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claim appended herebelow, unless this claim by its language specifically states otherwise.

I claim:

1. A control mechanism for manually actuating remotely positioned devices such as hydraulic valves and the like comprising in combination:

a driving means including a first drum-like member rotatably mounted by means of a first shaft to a support plate, a first coiled torsion spring having two tangentially extending extremities positioned about said first shaft, one of said extremities being movable with said drum-like member and the other of said extremities being held stationary with respect to said support plate whereby when said first drum-like member is rotated with respect to said support plate in a spring contracting direction said first torsion spring will be contracted and tend to force said member back to its initial position; a driven means including a second drum-like member rotatably mounted by means of a second shaft to a remotely positioned device so as to actuate said device upon rotational movement of said second drum-like member, a second coiled torsion spring having tangentially extending extremities positioned about said second shaft, one of the extremities of said second spring being movable with said second drum-like member and the other being held stationary with respect to said device whereby when said second member is rotated in a spring contracting direction said second torsion spring will be contracted and tend to force said second member back to its initial position; a thin flexible tension member connected between said first and second drum-like members and affixed to the peripheries thereof, said first and second torsion springs biasing their respective members in such directions as to tend to stretch said tension member therebetween, the respective torsional forces of said springs being such as to bias each of said drum-like members to a neutral position; an operating structure connected to said first drum-like member for rotating the same in either direction from said neutral position, said first drum-like member when rotated in one direction from said neutral position by said operating structure, pulling said tension member and rotating said second drum-like member in one direction against the resilient biasing of said second torsion spring to actuate said remote device in the one direction, said first drum-like member, when rotated in the other direction from said neutral position, by said operating structure overcoming said first torsion spring and slackening said tension member such that said second torsion spring rotates said second drum-like member in the other direction to actuate said remote device in the other direction.

References Cited

UNITED STATES PATENTS

| 1,787,786 | 1/1931 | Jerome | 188—2 |
| 1,289,623 | 12/1918 | Bobroff. | |
| 1,598,182 | 8/1926 | White et al. | 74—504 |
| 2,169,813 | 8/1939 | Parkin | 74—501.5 |
| 2,240,984 | 5/1941 | Desaulniers et al. | 74—501 X |

FOREIGN PATENTS

| 1,184,230 | 11/1959 | Germany. |
| 433,112 | 8/1935 | Great Britain. |

FRED C. MATTERN, JR., *Primary Examiner.*

C. F. GREEN, *Assistant Examiner.*